United States Patent
Lerner et al.

[11] Patent Number: 6,157,722
[45] Date of Patent: Dec. 5, 2000

[54] ENCRYPTION KEY MANAGEMENT SYSTEM AND METHOD

[75] Inventors: Daniel M. Lerner, Missouri City, Tex.; Charles Wesley MacLagan, Rehoboth, Mass.; John M. Geiselman, Missouri City; Robert E. Bobola, Seabrook, both of Tex.; Gregory A. Sucilla, Homewood, Ill.

[73] Assignee: Interlok Technologies, LLC, Missouri City, Tex.

[21] Appl. No.: 09/046,346

[22] Filed: Mar. 23, 1998

[51] Int. Cl.⁷ .................................................. H04L 9/00
[52] U.S. Cl. .................. 380/260; 380/255; 380/287; 380/283; 380/45; 380/28; 713/150; 713/200
[58] Field of Search .................. 380/20, 21, 24, 380/25, 43, 59, 287, 283, 45, 28, 280, 255, 260; 705/16, 18, 23, 41, 44, 61, 66, 71; 902/4, 5, 26, 27, 25; 713/202, 150, 200

[56] References Cited

U.S. PATENT DOCUMENTS

| | | | |
|---|---|---|---|
| 4,847,614 | 7/1989 | Keller | 380/825.56 |
| 5,048,085 | 9/1991 | Abraham et al. | 380/23 |
| 5,091,942 | 2/1992 | Dent . | |
| 5,241,598 | 8/1993 | Raith | 380/21 |
| 5,293,576 | 3/1994 | Mihm, Jr. et al. | 380/21 |
| 5,335,265 | 8/1994 | Cooper et al. . | |
| 5,392,353 | 2/1995 | Morales | 380/20 |
| 5,448,760 | 9/1995 | Frederick . | |
| 5,457,737 | 10/1995 | Wen | 379/62 |
| 5,554,977 | 9/1996 | Jablonski | 340/825 |
| 5,557,798 | 9/1996 | Skeen et al. . | |
| 5,588,060 | 12/1996 | Aziz . | |
| 5,633,930 | 5/1997 | Davis et al. | 380/24 |
| 5,671,283 | 9/1997 | Michener et al. | 380/25 |
| 5,774,804 | 6/1998 | Williams | 455/419 |
| 5,805,992 | 9/1998 | Schellinger | 455/411 |
| 5,822,691 | 10/1998 | Hosseini | 455/410 |

OTHER PUBLICATIONS

Ken Masica, Securing IP Packets with SKIP, Security Advisor Summer 1999, p. 36, 38–42.

*Primary Examiner*—Tod R. Swann
*Assistant Examiner*—Paul E. Callahan
*Attorney, Agent, or Firm*—Streets & Steele; Jeffrey L. Streets

[57] ABSTRACT

The invention relates to an encryption key management system and method of securely communicating data. First and second communicating devices are provided with a first and second identical sequences or databases of encryption keys. A pointer is set in both the first and second sequences at the same encryption key. Data from the first communicating device is encrypted using an encryption key adjacent the pointer in the first sequence of encryption keys. The encrypted data is then transmitted from the first communicating device and received by the second communicating device. The second communicating device decrypts the encrypted data received using an encryption key adjacent the pointer in the second sequence of encryption keys. After encrypting and/or decrypting data segments, the pointers in both the first and second sequences of encryption keys are incremented or moved in preparation for the next data segment or communication.

11 Claims, 7 Drawing Sheets

ENCRYPTION KEY MANAGEMENT SYSTEM AND METHOD

BACKGROUND OF THE INVENTION

1. Field of the Invention

The present invention relates to the security of communications, and more particularly to systems and methods of encrypting and decrypting information.

2. Background of the Invention

Communication signals are used widely in many different or interrelated fields, such as credit card authorization systems, cellular telephone and radio communications, satellite transmissions, telephone calls, computer networks and modem connections, automated teller machine transmissions, financial and banking transactions, direct broadcast television, garage door openers, automobile remote devices and the like. While each of these fields may have different communication protocols, performance objectives and technical constraints, each of the fields have at least some concern for the security of the communication. Specific security concerns may deal with the content of the communication itself (often protected by encryption methods), the integrity of the communication (often protected by error-checking and anti-virus software), and authorized access to the communication (often protected by account codes and passwords).

Unauthorized access to communications and communicating devices has become a problem in many of the fields mentioned. Computer networks have been broken into by determining authorized account codes and passwords, thereby gaining access to proprietary information or computing capabilities. Credit card transactions may be charged by an unauthorized person by merely possessing a lost or stolen card. Cellular telephones may be duplicated or cloned to produce a large number of fraudulent telephones having the same account codes and personal identification codes as a lost or stolen authentic cellular telephone. Efforts to combat these unauthorized communications have taken many forms.

One security measure implemented in typical various communication systems is the authentication of communicating devices at registration, initiation or reception of the communication. Authentication may be simply viewed as the process of confirming the identity of the communicating device, perhaps by transmitting an account or identification code and a password. In applications where the communicating device is mobile, authentication often requires communication between or through a plurality of communicating devices or networks in order to verify the identity of the communicating device and perhaps the user of the communicating device.

For example, a serious problem in existing cellular telephone systems may be referred to as the "false mobile station" syndrome. It is presently possible to copy the entire memory contents of a mobile station and to use that information to manufacture clones which can demand and receive service from the network. Cellular phones may be cloned by reading the entire memory contents of the phone, including its identification codes, secret keys, internally stored personal identification codes, signatures, etc., and writing the same codes into any number of similar "clone" phones. The cloning procedure can become quite sophisticated and may include software modifications which replace physically stored information with electronically stored information so that a number of stored mobile station identities may be cyclically rotated within one fraudulent mobile station and used to imitate several authentic mobile stations.

Similar breaches of communications have occurred in financial transactions involving credit cards. Typically, the information on a lost or stolen credit card can be electronically read and duplicated on any number of credit cards. The cards are then distributed and used until either the credit limit of the card is surpassed or the card is reported stolen or lost to the credit card company. Significant actual losses are experienced each year due to the use of such "cloned" credit cards.

Many communication systems, including cellular telephone networks and credit card authentication or authorization systems, comprise a vast number of distributed communicating devices (i.e., mobile cellular phones or credit cards and credit card readers) that transmit data to a central computer system in charge of determining whether or not to allow the communication to go through. The central computer system may execute an authorization algorithm to determine if the credit card has a valid account or identification number, if there is an available balance of credit and, perhaps, if a valid personal identification number has been given or entered. However, sophisticated thieves have been able to duplicate the credit card with valid identification numbers and determine even the personal identification number.

Similarly, computer network communications or computer-to-computer communications may include files that are locked, password protected, zipped and/or encrypted for various reasons, including the security of the content of the communication. Password protection provides a limited degree of security, primarily protecting a communication from being accessed by persons who casually encounter the file, but this security can still be violated. Encryption is perhaps the most secure means for preventing outsiders from obtaining the content of the communication and, therefore, is in widespread use by banks and other financial institutions throughout the world for many or all of their electronic transactions.

However, the security of even the most sophisticated encryption methods is jeopardized by the growing computing power available to individuals and groups. Complex encryption algorithms using 64 bit keys having $2^{64}$ (about $1.8 \times 10^{19}$) possible keys could become marginal protection against outside access to the communication.

Therefore, there is a need for improved methods of securing communications between two or more communicating devices and/or users. More particularly, there is a need for methods of preventing unauthorized access to the content of the communication. It would be desirable to have simple systems or methods for encrypting, transmitting and decrypting information. Furthermore, it would also be desirable if the systems or methods were compatible with exiting and proven encryption techniques, algorithms and/or data transmission standards. Finally, it would be especially desirable if the security of the communication could be maintained despite interception of the communication and eventual deciphering of a single key.

SUMMARY OF THE INVENTION

The present invention provides a method of securely communicating data, comprising: (a) providing a first communicating device with a first sequence of encryption keys; (b) providing a second communicating device with a second sequence of encryption keys, wherein the first and second sequences are identical; (c) setting pointers in the first and second sequences at the same encryption key; (d) encrypting data from the first communicating device using an encryption key adjacent the pointer in the first sequence of encryption keys; (e) transmitting the encrypted data from the first communicating device; (f) receiving the encrypted data in the second communicating device; (g) decrypting the encrypted data received by the second communicating device using an encryption key adjacent the pointer in the second sequence of encryption keys; and (h) incrementing the pointers in both the first and second sequences of encryption keys. The first and second sequences of encryption keys may be stored in a database or calculated as needed using an algorithm. Exemplary communicating devices may include computers, direct broadcast television systems and the like. Furthermore, the communication may be transmitted in any known manner, such as electronic means, radio wave means or optical wave means.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are, therefore, not to be considered limiting of its scope, for the invention may admit to other equally effective embodiments.

DESCRIPTION OF THE PREFERRED EMBODIMENT

Figure 1:
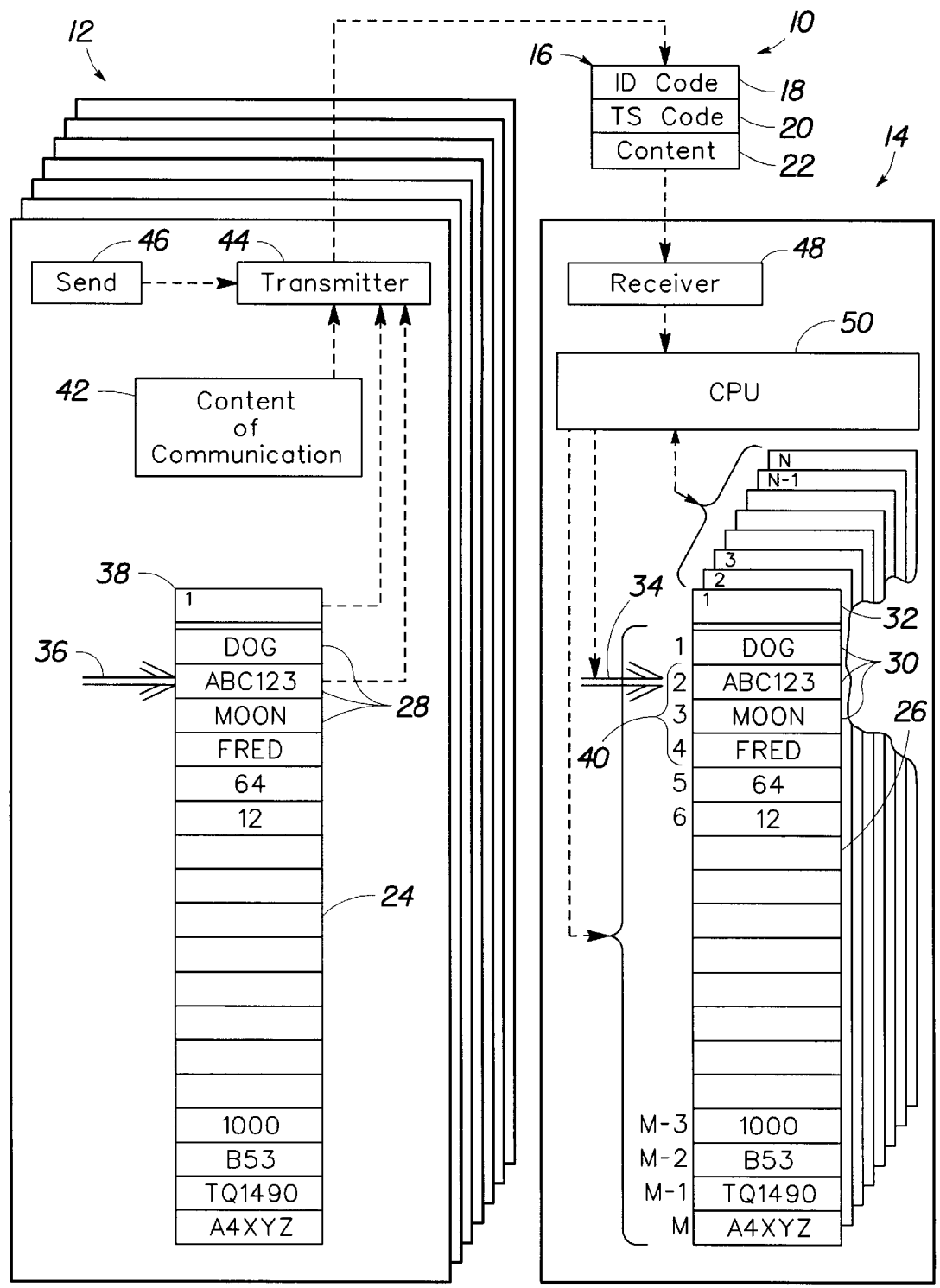
FIG. 1 is a schematic diagram of an identification and authorization system in accordance with the present invention.

The present invention provides a method and apparatus for identifying and approving authentic communications. Such method and apparatus are important for preventing unauthorized communications through various communication media, including electronic, audible, visual or the like. Perhaps the most widely used media for communications in business and personal applications include electronic and radio frequency communications such as those involving computer to computer transfers, credit card authorization and approval, cellular telephone calls and data transmissions, satellite broadcasts, automated teller machine transactions, and other electronic communications. For various reasons, it is frequently desirable or necessary for access to these communications to be restricted to authorized persons, authorized equipment, authorized locations, and the like. While the set of criteria necessary to authenticate a transmission or communication may be short and simple or long and complicated, the present invention proposes a simple, yet effective, method for preventing unauthorized communications. More particularly, the present invention prevents the successful use of multiple cloned or otherwise fraudulent devices, and limits the use of even a single cloned or otherwise fraudulent device to the time interval between the "cloning" event and the next authentic communication. Such time interval may be as long as several days (for example an infrequently used credit card) or as short as fractions of a second (for example in electronic financial transactions between institutions).

In one aspect of the invention, a method is provided for preventing the cloning and fraudulent use of various authentic communicating devices. Attempts to increase the complexity of the communicating device or the difficulty of successfully duplicating the device have met with limited success, because once the device has been successfully cloned, unauthorized communications may be accomplished. The methods of the present invention do not depend upon the complexity of the physical communicating device or the magnitude (i.e., the number of bits) of possible security codes or keys, but rather, the present invention provides for transmitting a transaction specific code along with identification codes and the communication itself in accordance with a predetermined set of transaction codes known to a central authorizing device or host. These codes may take various forms including, but not limited to, numeric, alphabetic, alpha numeric and the like and may be transmitted through various media including, but not limited to, digital or analog electronic signals, radio waves, light waves, chemical or other optical means, other wave forms, and the like. The transaction specific code may be as simple as a sequential set of algorithmically generated numbers, such as 1 through 100, or some random set of codes predetermined and stored in both the communicating device and the host communicating device.

The invention operates on the principal that when an authorized communicating device transmits a series of communications, with each communication accompanied by a transaction specific code, the host or receiving device, such as a computer, will expect to receive the transaction specific codes in a particular, predetermined sequence. So long as subsequent communications contain a transaction specific code consistent with the existence of only one authorized communicating device having a given identification code, then the communication may be allowed or authorized. In the event that communications are initiated containing transaction specific codes which indicate the presence of duplicate communicating devices, then the communications will be disallowed. The methods just described do not address or prevent the physical cloning of the communicating device, but rather prevent the successful use of cloned devices over a period of time or the successful access to a communication over a period of time.

In another aspect of the invention, subsequent communications may be re-initiated by resetting the pointer at a different point in the sequence of predetermined codes in the authorized communicating device. In this case, the host device must also be informed of the reset point in order maintain synchronization. Alternatively, the communicating device and host device may be provided with a new set of transactions specific codes. The provision of new codes may be accomplished in any manner, manual or automatic, but automatic or periodic updating of codes may require modification of existing communicating devices which do not have sufficient receiving and storing capabilities.

Typical cloning patterns, such as those experienced in the credit card and cellular telephone markets, involve the loss or theft of a single authorized communicating device, i.e., the physical credit card or cellular telephone, which is then duplicated to provide a large number of fraudulent devices which operate identical to the authorized communicating device. In accordance with the prior art, the successfully cloned, yet fraudulent, devices were allowed to communicate successfully leading to loses of millions or billions of dollars. As indicated above, the methods of the present invention do not rely upon device designs which are presently difficult to copy or clone, but provides a method by which the use of two or more devices, such as the authorized device and one fraudulent device or multiple fraudulent devices, is identified by the host device upon receiving a transaction specific code which is inconsistent with the predetermined set of codes.

In one aspect of the invention, the degree of inconsistency in the transaction specific codes can be modified or tailored to a specific application. For example, a transaction specific code may be sufficient to allow a communication to be authorized so long as it falls within a particular range of transaction specific codes expected by the host. More particularly, in the situation where the transaction specific codes are a sequence of numbers from 1 through 100 listed in numerical order, a sequence of communications would be expected to include transaction specific codes that fall in a sequence, such as 1, 2, 3, 4, 5, etc. However, for specific applications such as credit card use, it may be acceptable to allow or authorize communications containing transaction specific codes that are within a range of codes next expected by the host. Therefore, if the host was expecting to received transaction specific codes of 1, 2, 3, 4, 5, 6, 7, 8, etc. over a series of communications, then a series of communications containing transaction specific codes of 1, 2, 4, 5, 7, 8 would be allowed if the host device were programmed with a tolerance of two codes. It is also anticipated that the host computer may take additional action if the transaction code tolerance is required too frequently.

It should be recognized that the set of codes to be transmitted by the authorized communicating device and stored in a database within the host device may comprise a mere list or database of transaction specific codes established in a given order. While the fields of the database are maintained in a certain sequence, the transaction specific codes within those fields may vary in any manner. Therefore, the database programmed into the communicating device and the host device may have a database segment containing the numerical transaction specific codes of 54, 86, 32, 64, 35, and 97. To an outside observer or someone intercepting these codes, the code would appear to be random or at least undeterminable. However, the host device knows what the next expected transaction specific code is to be, i.e., if the previous transaction specific code was 86, then the next expected transaction specific code is 32, but transaction specific code of 64 would be accepted if the tolerance were set at two fields. This ability allows the host computer to determine whether or not the communication is authentic. In this context, the concept of tolerance no longer implies that the transaction specific code has a numerical value within a certain range, but rather that the transaction specific code may be found within a range of fields within the database forwardly adjacent to a field containing the next expected code. The ability of the database to contain any number of transaction specific codes of any length or type of signal vastly increases the difficulty of predicting the next transaction specific code. However, even in the simplest of embodiments, where the transaction specific codes comprise a sequence of numbers in numerical order, the invention still prevents widespread cloning in the manner described above. Furthermore, a simple embodiment of the present invention allows the host computer to dispense with an actual database but rather comprise a single data register or memory location for storing either the last transaction specific code, the next expected transaction specific code, or some equivalent means of tracking used or soon to be used codes.

While the foregoing discussion has dealt primarily with detecting unauthorized communicating devices, the present invention may also include the ability to detect unauthorized users. In many applications, including credit card authorization and approval and cellular telephone communications, it is frequently desirable to verify that the communication is being initiated by an authorized user. The inclusion of a user authorization system is beneficial for reducing the use of the authentic communicating device when it has been stolen or lost. Losses due to the use of lost or stolen communicating devices is also very significant, but is inherently limited to the capacity of the authorized communicating device itself, i.e., one communication at a time, a credit limit, etc. Furthermore, the use of lost or stolen communicating devices by unauthorized users may be restricted by the use of user specific codes, such as a personal identification number (PIN), finger print, password, voice command and the like.

In another aspect of the invention, the host device and/or the communicating device may be programmed to verify the identity and authenticity of the device alone or in combination with the user. In one example, the host computer may first verify that the communication is being initiated from an authorized communicating device, then prompt the user to enter a personal identification code (PIN) indicating that the user is also authorized. Only upon satisfaction of these two criteria is the communication be allowed to proceed. It should be recognized that the host device could be programmed to verify these two codes, or other additional codes and authorizations, in any order. In another example, the communicating device itself may require the successful input of a personal identification code prior to enabling or energizing the transaction specific code, any portion of the device identification code or even some portion of the communication itself.

A still further aspect of the invention provides for automatic re-synchronization of the transaction specific codes following one or more unauthorized communications. Re-synchronization methods according to the present invention may be achieved by programming the host device to reset the pointer in a database of transaction specific codes for a particular identification code upon receiving a series of attempted communications having a series of transaction specific codes that match a portion of the database. For example, after receiving an attempted communication having a transaction specific code that is not the next expected transaction specific code or within the range of tolerance, no further communications using the same identification code can proceed until the transaction specific codes of the communicating device and the host are re-synchronized. If the host device is programmed to allow re-synchronization after receiving three transaction specific codes (i.e., 12, 13, 14) that match a portion of the host database (i.e., 10, 11, 12, 13, 14, 15, 16, etc.) for the given identification code, then the pointer in the host database is reset for the next transaction specific code (i.e., 15) in the database. Subsequent communications may proceed in accordance with the aforementioned methods. It may be beneficial to a separate range of tolerance for re-synchronization in order to prevent re-synchronization at a dramatically different point in the sequence of transaction specific codes.

Another aspect of the invention provides for periodically incrementing, or otherwise moving, the pointers in the transaction specific codes in both the communicating device and the host device. The periodic movement of the pointer is advantageous because it effectively shortens the time period or window of opportunity in which a cloned device having a full and correct set of transaction specific codes may operate. For example, if an authentic communicating device is infrequently used, a cloned device may initiate successful communications until such time as the authentic communicating device is used again. However, if the authentic communicating device and the host device are designed or programmed for periodically moving their database pointers, in accordance with a predetermined algorithm, then the cloned device may initiate successful communications only until the next movement of the database pointers. Specifically, the database pointers may be incremented by one or more fields after specific time intervals, i.e., ten minutes, an hour, a day, etc.

FIG. 1 is a schematic diagram of an identification and authorization system 10 in accordance with the present invention. A communicating device 12 generates and transmits a communication 16 to a host device 14, wherein the communication 16 comprises an identification code 18, a transaction specific code 20 and the content 22 of the communication itself. Note that both the communicating device 12 and the host device 14 contain similar databases, lists or tables 24, 26, respectively, having a plurality of fields 28, 30 containing the same transaction specific codes in the same sequence. Prior to the first communication, a pointer in both databases is directed to the same field containing the same transaction specific code.

It should be recognized that the host device 14, or perhaps even communicating devices which are capable of transmitting or receiving communications from or to a plurality of other devices, may have a plurality of n lists of transaction specific codes, where n is the number of authorized identification codes, such as the identification code 32 having the list 26. Each of the n lists in the host device 14 will have a pointer, such as pointer 34, which indicates the next expected field in the sequence of m fields in the list or database 26 which, in turn, contains the next expected transaction specific code (i.e., TS Code=ABC123). Similarly, the database 24 of the communicating device 12 has a pointer 36 which indicates the next transaction specific code (i.e., ABC123) to be transmitted along with the identification code 38. Upon receiving the communication 16, the host device 14 determines the identification code 18 and looks for the identification code among the n authorized identification codes. Then the host device 14 compares the transaction specific code 20 received from the communicating device 12 with the transaction specific code 30 indicated by the pointer 34.

During subsequent communications, the transmission from the communicating device 12 will contain subsequent transaction specific codes 28 from the database 24. Errant or failed communications may lead to the pointer 36 of the communicating device 12 incrementing to the next field in the database 24 without the communication ever being received by the host device 14 and, consequently, without the database 26 of the host device 14 ever being incremented. This and other similar situations represent a benefit of using the tolerance feature described above. If the host device 14 receives a transaction specific code 20 falling in the database within a reasonable range of fields, typically only fields in the forward direction, then the communication is allowed to proceed. For example, if the tolerance is set to three fields 40 and the pointer 34 is set at the field containing "ABC123", then the host device 14 may authorize communications having an identification code 32 and a transaction specific code of "ABD123", "MOON" or "FRED", but not "DOG" (since it is not in a forwardly directed field) or "64" (since it is outside the tolerance range of 3). In this example, if the communication was authorized on the basis of a transaction specific code of "FRED", then the database pointer 34 in the host device 14 would preferably be reset to a next expected transaction specific code of "64" which matches that of the communicating device 12.

It should be recognized that communications having acceptable identification codes and transaction specific codes may be further subject to verification of other conditions, such as a personal identification number (PIN) and the like. Examples of other conditions or criteria useful for determining whether or not to authorize a particular communication include the location from which the communication is initiated, the frequency with which communications occur, the type of communication being attempted, the content of the communication itself, and discrepancies between time and space which indicate the unlikely use of a single device suggesting cloning. Other useful criteria will become apparent in specific applications.

As shown in FIG. 1, the communicating device 12 preferably includes a member 42 for providing the content 22 of the communication 16 to a transmitter 44. The actual transmission may be initiated in any number of manners, but specifically may be initiated with a "send" button 46, such as that on a cellular telephone or by the act of swiping a credit card. The host device 14 preferably includes a receiver 48 and a central processing unit (CPU) 50. The CPU 50 is provided with the communication 16 from the receiver 48 and executes a series of steps in order to authenticate the communication.

Figure 2:
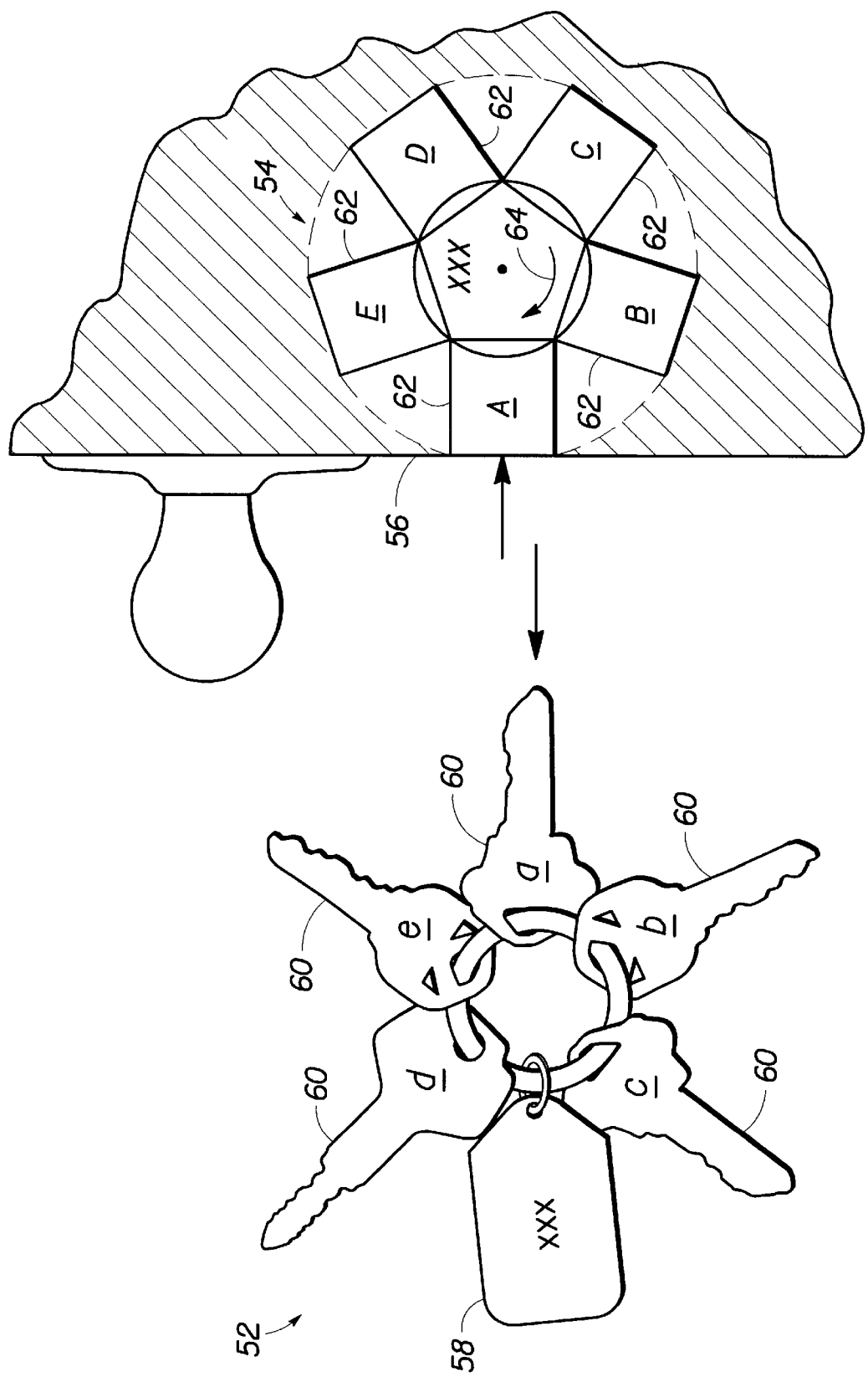
FIG. 2 is a conceptual diagram of one aspect of the present invention.

FIG. 2 is a conceptual diagram which is useful for arriving at a full understanding of the one aspect of the present invention. The diagram of FIG. 2 presents a set of keys on a ring 52 and a set of locks 54 in a door 56 which operate analogous to the present invention. The key ring 52 (communicating device) includes a fob 58 (identification code) and a plurality of keys 60 (transaction specific codes). The door 56 (host device) includes a plurality of locks 62 (expected transaction specific codes) for each fob (identification code) which can only be unlocked by using a specific key (transmitted transaction specific code). The locks 62 (transaction specific codes) in the door (host) are rotated (incremented) in the direction of arrow 64 by a mechanism each time the door is unlocked. Similarly, the keys (transaction specific codes) on the key ring 52 are rotated (incremented) each time a key is used.

The door and key ring are initially used as shown, with the key a and lock A ready for the first unlocking of the door (communication). When key a unlocks the door with lock A, then the door is open for a transaction to pass therethrough. Note that the transaction does not need to have any actual connection with the key nor the lock. Anything may move through the doorway once the door is unlocked.

When the transaction is completed, the door is closed, the next lock in the rotation is moved into place and the keys are rotated around the ring in preparation for the next unlocking. In this case, the key b is positioned as the next key to be used and the lock B is positioned as the next operating lock in the door.

To enable the next transaction, key b is used with lock B. The door is unlocked and open for the transaction as before.

When this second transaction is completed, the door is closed and both the keys are rotated to key c and the locks are rotated to lock C. Note that this transaction system operates with synchronous rotation of the keys and locks. Only one key on the ring will unlock the door for any specific transaction, thereby providing much greater security than a more complex key.

Assuming that the key ring were duplicated (cloned) and an attempt to open the door was made, there would only be a one-in-five possibility of opening the door on the first try, since there are five keys in this example. However, this mechanical analogy has been greatly simplified for the express purpose of illustrating the concept of sequential synchronous keys. In an actual application of the present invention, there could be any number of key and lock pairs (i.e., thousands, millions or more) making the potential of randomly unlocking the door very unlikely.

Continuing with the analogy, assume that a guard (CPU) is posted at the door with instructions to take various actions to intervene with repeated use of the keys if the door does not unlock on the first attempt. The guard could require the key holder to wait some time before using the key again, call various authorities to further guard the door, confiscate the keys or identify the key holder. This measure would make the attempted access much more time consuming and risky for a duplicated ring of keys to be used.

Further yet, the key ring may be kept locked in a separate safe (personal identification number) between uses. Now it will be difficult to gain access to the key ring and use or duplicate the keys. The safe may be designed with various time delays to make it more difficult to open by simply making repetitive guesses about the combination. Further, the safe could be designed to destroy the key ring when sufficient tampering with the safe is detected.

This mechanical analogy illustrates four features of sequential synchronized keys: (1) it is difficult to guess the next key; (2) the keys are not specifically related to the content of the transaction; (3) there are various ways of guarding the lock from tampering; and (4) there are various ways of guarding the keys from duplication.

Figure 3:
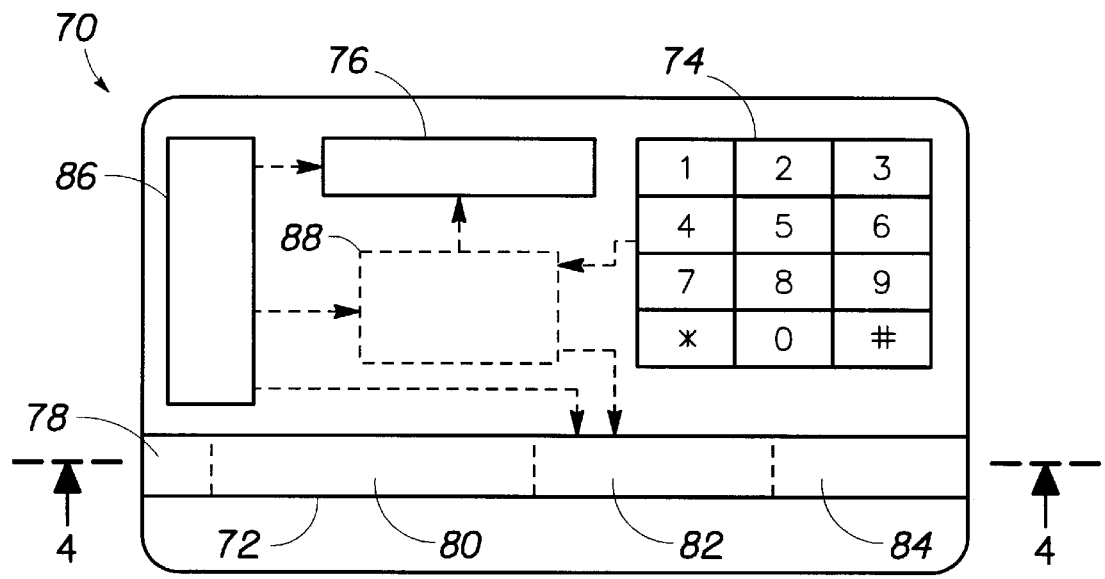
FIG. 3 is a schematic diagram of a simple credit card apparatus which includes a magnetic strip or other communication media.

FIG. 3 is a schematic diagram of a credit card apparatus 70 which includes a body member 71, perhaps made of plastic, and a magnetic strip 72, such as iron oxide, or other communication media which is preferably enabled upon successful entry of a predetermined personal identification number. A personal identification number may be entered through a dedicated or multipurpose key pad 74 made according to various designs known in the art. The complexity of the keypad 74 may vary from a full ten digit keypad or a full alphabetic keyboard to a much simpler keypad containing, for example, three or four buttons that are color coded. Regardless of the complexity or number of keys, the personal identification number may contain as many digits as desirable.

In a further aspect of the invention, the successful entry of a personal identification number or code may also result in the generation of a visual indicator on a display 76 that signifies successful entry. Such a visual indicator would be useful in applications where the initiation of the communication is attended by a representative interested in the proper authorization of the communication, for example, a sales clerk in a retail outlet which either does not have electronic authorization equipment or such equipment is presently inoperable. A visual indicator may also be useful in situations where electronic verification equipment is available, but the sales representative is available to monitor the number of unsuccessful attempts at entering the personal identification number. In any of these circumstances, the sales clerk could require the visual indicator prior to proceeding with the transaction or communication.

Still referring to FIG. 2, the card 70 of the present invention makes use of conventional magnetic media supplemented with at least one electronically generated bit of information. This electronically generated bit may occur anywhere in the magnetic strip 72, including the region 78 containing a cyclic redundancy check or other verification code such as a check bit system, the region 80 containing an identification number, the region 82 containing the transaction specific code, or any other region. Further, the electronically generated bit may comprise its own region 84, perhaps indicating to the host through a card reader that the user is authorized, i.e., has successfully entered the personal identification number.

Operation of the card 70 is facilitated by an energy source 86, such as a lithium battery or a solar cell. The energy source 86 must provide sufficient power for any device on the card, such as the display 76, an electronically generated bit (shown here as located in the region 82), the keypad 74 and a CPU 88. The CPU 88 may be entirely embedded within the card 70 or located as desired for protection of the CPU or ease of manufacture. The CPU 88 is responsible for verifying correct PIN entry from the keypad 74, providing a signal to display 76, controlling the electronically generated bit(s) (shown here in region 82), and other various functions that are necessary or desirable to the function of the card. Further, the card 70 may comprise a multifunction device such as a calculator, etc.

Figure 4:
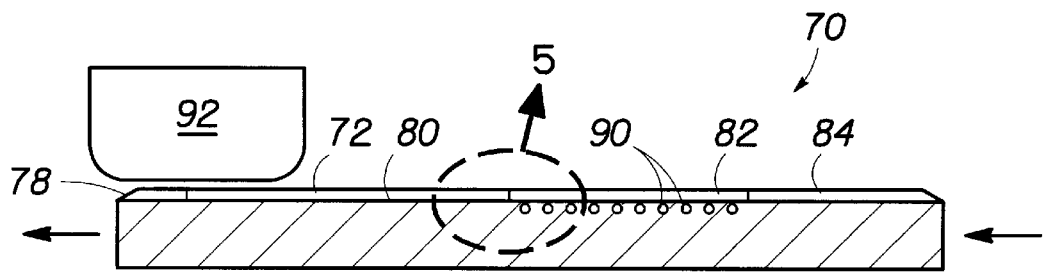
FIG. 4 is a cross-sectional view of the credit card of FIG. 2.

FIG. 4 is a cross-sectional view of the credit card 70 of FIG. 3. Specifically, an electronically generated bit is produced by a small wire 90 disposed across the path of the magnetic strip 72. Each wire 90 is coupled to the energy source or battery 86 which, under control of the CPU 88, will provide electrical current to the wire 90 for a predetermined time period. The amount of current passing through the wire 90 is preferably no more than that sufficient to induce a magnetic flux at the surface of the credit card 70 which is equivalent to, or at least detectable by a card reader 92 as equivalent to, a zero (0) or a one (1) in the magnetic strip. When the electronically generated bit is inactive (not energized), reading the magnetic strip will indicate that a bit is missing (i.e., neither a zero or one are detected) and that the card is damaged, ineffective or unauthorized.

In another aspect of the invention, this electronically generated bit or any number of electronically generated bits may be provided to indicate other information about the use of the card, such as an excessive number of attempts to enter the personal identification code. Other uses for additional electronically generated bits will become apparent in particular applications.

The present invention encompasses the use of any number of electronically generated bits or conductive wires 90. However, in order to merely energize the card and complete a coherent transmission, only a single wire is necessary. However, in other embodiments, it is anticipated that multiple wires will be desirable. For example, transaction specific codes may be provided by the internal CPU or other similar logic circuit and provided to the card reader or host device through a series of electronically generated bits positioned adjacent the active strip area or region 80.

A plurality of adjacent of electronically conducting wires 90 may be coupled to a single battery through a series of resistors. The circuit is roughly the equivalent of a plurality of amplifiers which increase the electronic signal being generated by the CPU.

Figure 5:
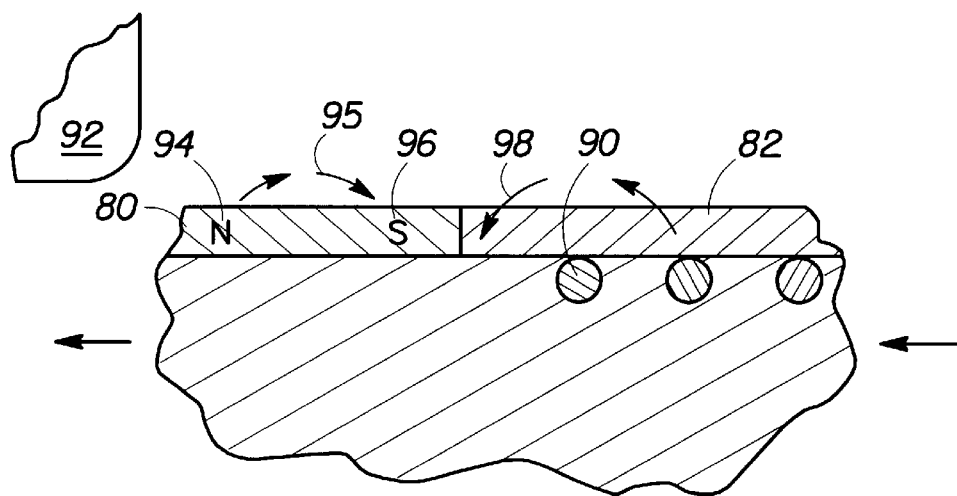
FIG. 5 is a partial cross-sectional view of the credit card of FIG. 4.

FIG. 5 is a partial cross-sectional view of the credit card of FIG. 4. A portion of the magnetic strip region 80 is shown made of a magnetic media, such as iron oxide, which form a magnetic field 95 between a north pole 94 and an adjacent south pole 96, to indicate a single bit of information containing a "1". Immediately adjacent or abutting the region 80 is a region 82 having at least one electronically generated bit produced by the conducting wire 90 disposed in the card. The wire 90 may be round or square, but is preferably square to maximize the magnetic field 98 generated above the card surface in accordance with known principles of induction. The "right-hand rule" of induction requires that an electrical current flowing through the wire 90 in the direction out of the page will cause a magnetic flux 98 in a direction counter-clockwise on the page. The magnetic field 98 can be made similar in strength to the magnetic field 95 by adjusting the amount of electrical current in the wire 90. Additionally, each wire 90 shown in FIGS. 4 and 5 may be replaced by multiple windings of a smaller wire in order to obtain greater magnetic flux with the same amount of current. These and other expedient modifications will be apparent to one of ordinary skill in the art and are deemed to be within the scope of the present invention.

Figure 6:
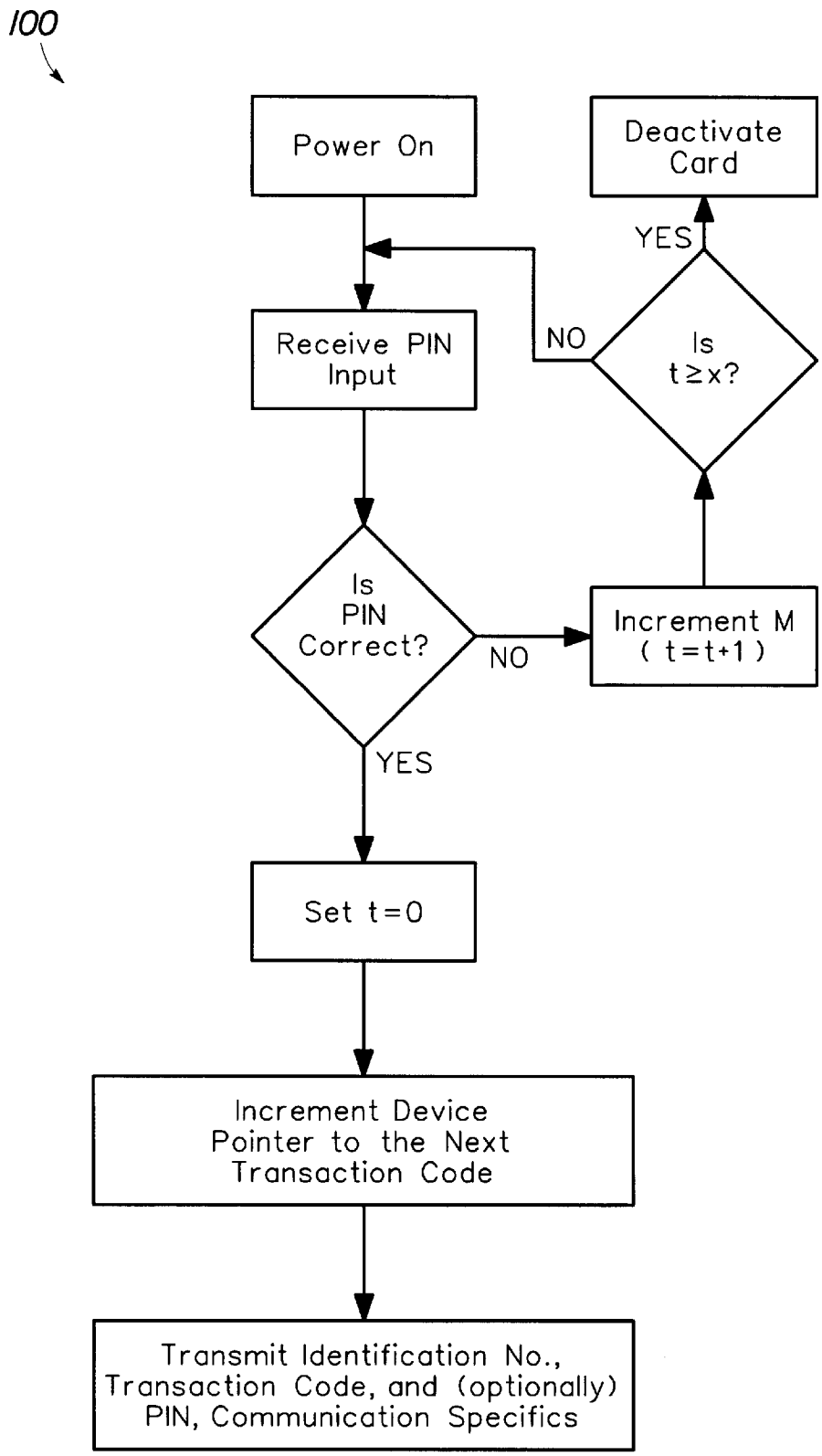
FIG. 6 is logic diagram for operating a communicating device.

FIG. 6 is a logic diagram of a program 100 for operating a communicating device. While the communicating device may operate in various manners without departing from the present invention, the program 100 includes verifying a PIN, incrementing the device pointer to the next transaction code, then transmitting the identification number, the transaction code and other optional information. Specifically, the PIN verification procedure may allow multiple attempts at entering the correct PIN, but deactivates the card if the correct PIN is not entered within x tries.

Figure 7A:
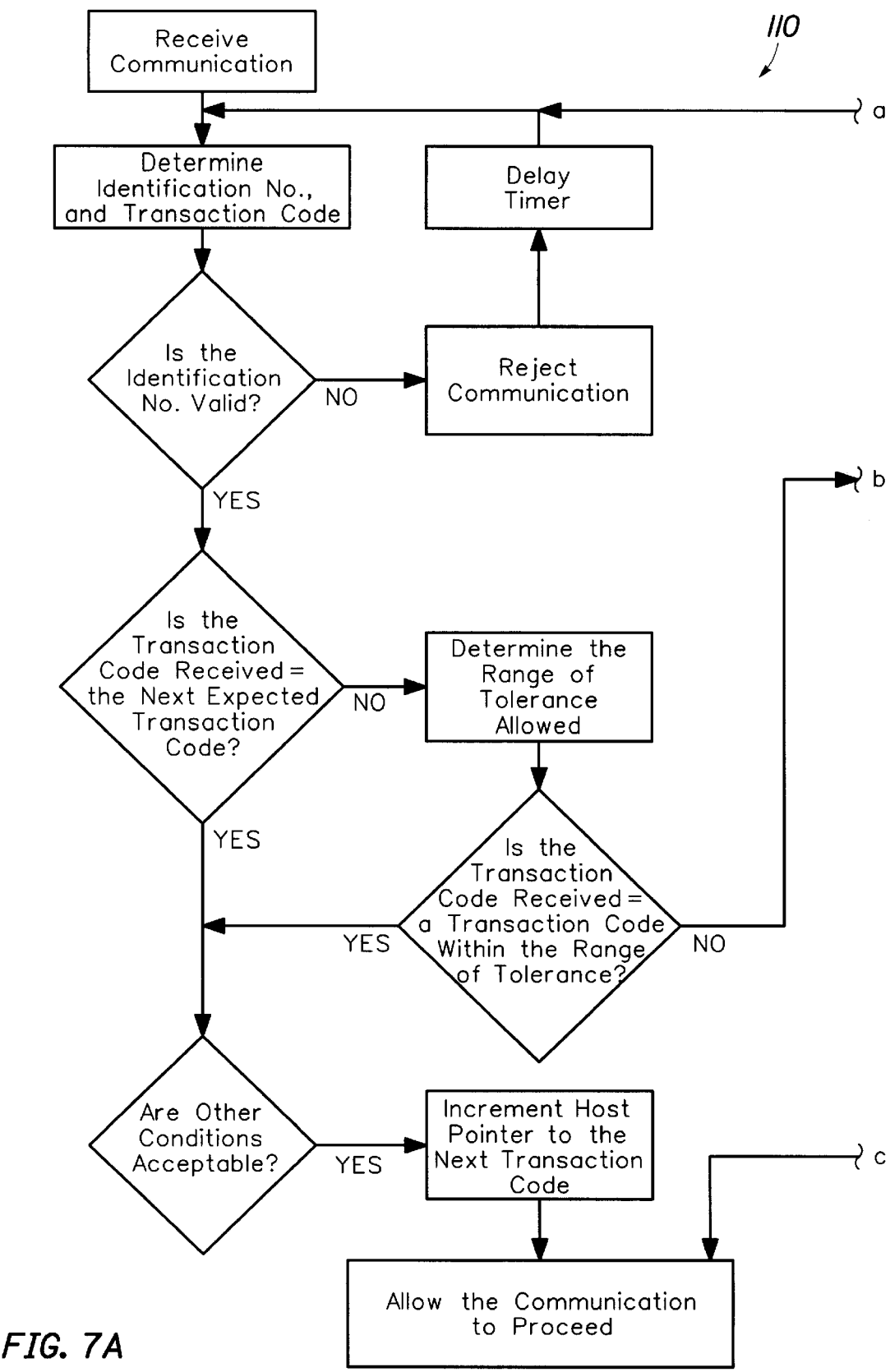
FIG. 7 is logic diagram for operating a host device.
Figure 7B:
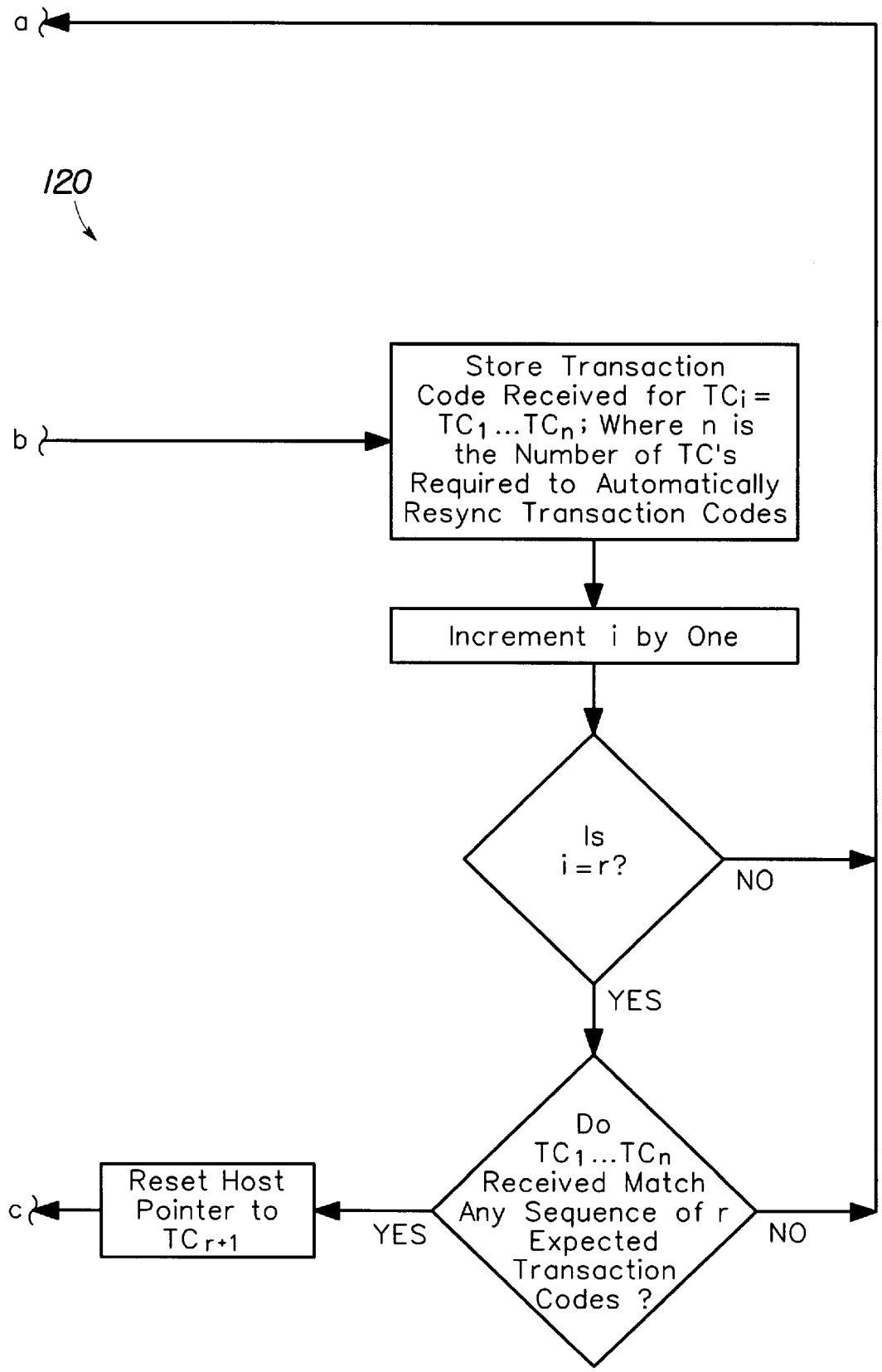

FIG. 7 is a logic diagram of a program 110 for operating a host device, such as a central or host computer having electronic communication with a plurality of communicating devices. This type of communication is typically discontinuous, meaning that communication sessions are of a finite duration and are separated by at least some pause or period of non-communication. As previously indicated, the host device will comprise a database containing a sequence of fields storing transaction specific codes. Each authorized communicating device is provided with a database or list of this same type contained in its computer memory, perhaps having a unique set of codes for each device. The same or different database may also contain information about the user, identification codes, device identification codes, and other verification information such as mother's maiden name and other information personal to the user. Such database may also contain historical information about the use of the authorized device or the preferences of the authorized user. All of this information may potentially be used by the computer to determine whether or not a communication is to be allowed.

As shown in FIG. 7, the computer program 110 executed by the host device receives a communication from a communicating device and identifies or determines the various regions containing particular information. The identification number of the communicating device is compared with authorized identification numbers in the host to identify which valid communicating device is being used or if the communicating device has an identification number that is not authorized. If the identification code is not valid, then the communication will be rejected.

If the identification number of the device is valid, then the host will locate its database of information and will begin to verify various information. This verification may proceed in any logical order, but is presented here as proceeding to determine whether the transactions specific code received from the communicating device is the same as the next expected transaction specific code in the host database. Without the programming or entry of a tolerance factor in the computer program, the transaction specific code transmitted and the next expected transaction specific code must be identical to allow the communication to proceed. However, it is believed to be beneficial in many applications to provide for some degree of tolerance. The term "tolerance" in the context of transaction specific codes preferably means that the transaction specific code received from the communicating device is identical to a transaction specific code stored in the host database within a range of fields sequentially subsequent to a previously received transaction specific code, i.e., a transaction specific code from a prior communication that was successful or authorized. Restated for the purposes of clarity, the host database pointer can be made forwardly tolerant by any number of fields. The extent of the forward tolerance will be specific to various applications depending upon a host of factors including the reliability of the data or communication, i.e., the nature and frequency of interruptions that are likely to occur even by authorized devices. In this manner the tolerance factor becomes a filter for distinguishing authorized communications from those that are not.

If the transaction specific code received is accepted, the pointer in the host database is reset at the transaction specific code received. The program may then look to other criteria in the transmission before authorizing the communication. As previously indicated these other criteria may include the specific location from which the communication is initiated, the frequency with which communications have been initiated, the nature or content of the communication itself, or other criteria that would be application specific.

Depending upon the complexity of the communication or the degree of security desired, the communicating device may operate in a manner such that its database is self-incrementing upon successful entry of the personal identification code or upon successful communication with the host device. Alternatively, the database in the communicating device may be incremented only upon successful communication with the host device and/or only at the command of the host device. In the later situation, the host computer may send a new field location, or pointer, in the database rather than simply the next incremental location. Furthermore, in some applications where the communicating device has sufficient receiving and storing capabilities, the host computer may simply hand the communicating device its next transaction specific code necessary for communicating. Subsequent communications would then contain the new transaction specific code or password and any unauthorized communications would contain old or previously used codes. Therefore, while the role of the host computer is to verify or authenticate the communication, either the communicating device itself or the host computer may take control over the selection of the next transaction specific code, at least with a predetermined set of codes. In various embodiments, this control may be granted solely to the communicating device, solely to the host computer, or some combination thereof. An example of combined control over the transaction specific code sequence would be a communicating device programmed to increment after each communication, but subject to the host computer's periodic command to relocate the pointer in its database.

It should be recognized that one of the distinct advantages of the present invention is its adaptability to existing communication systems without significant modification of the communicating device or its peripherals. For example, in the application of cellular telephone communications, the modem cellular telephone is already equipped with a CPU having at least a minimum counting capability. A simple programming change in the cellular telephone would allow the counter's equivalent of a transaction specific code to be uploaded and transmitted along with the cellular telephone identification number and/or user identification number. Programming of the host device would proceed in accordance with the description of FIG. 7.

Further, the program 110 of FIG. 7 may optionally include a subroutine 120 for automatically resynchronizing the pointer in the host database to correspond with the pointer in the database of the communicating device. The pointer is resynchronized by receiving and storing a sequence of r transaction specific codes from a sequence of r attempted communications. If the sequence of transaction specific codes matches any sequence of expected transaction specific codes in the host database, then the host pointer is reset to the transaction specific code following the last received transaction specific code.

When the present invention is applied to credit card use, the credit card itself must be modified to include a CPU, counter circuit or other logic circuit which can maintain, store, and update the transaction specific codes and a means for transmitting the transaction specific code to the credit card reader. The preferred method of achieving this is shown in FIGS. 3–5. While this is a significant modification of a credit card, the issuance of new cards made in accordance with FIGS. 3–5 is estimated to cost less than about $2.00 per card and is deemed by the inventors to be a reasonable expense in light of the potential billion dollar savings in preventing a significant portion of credit card fraud. Modifications required of the host device are mere program changes which are believed to be relatively minor. Alternatively, various aspects of the present invention may be realized without modifying the actual credit card or other communicating devices by providing a separate, supplementary device, such as a hand held electronic device having a keypad, CPU, energy source and display, to be used in conjunction with the credit card. Such supplementary device would be used in an identical fashion as that described with reference to FIGS. 3–5, except that PIN input and transaction code generation and display are not performed within the card but in the supplementary device. The supplementary device may provide various modes of display or communication of the transaction specific code to the host device, including a visual display that is manually entered into the point-of-sale computer or card reader, an electronic signal, or other communication means known in the art.

In one alternative embodiment, upon detection of an inconsistent or out of sequence transaction specific code, the host computer does not need to immediately disallow the attempted communication but rather may prompt the communicating device for additional information which is known only to the authorized user. In this manner, inconvenience to authorized users may be minimized while achieving the objective of preventing use of cloned devices. The prompt for user specific information may include any information that the authorized user has previously made available to the host device or an individual entity operating the host device. For example, discussions with financial institutions or credit card organizations about an individuals credit may require the requester to successfully give the maiden name of the user's mother. Furthermore, it should be recognized that this user specific information does not need to be the same type of information for each user.

While most of the foregoing discussion about the present invention has focused on the use of databases, lists and tables for storing transaction specific codes, it may be preferred in some applications having limited memory to provide an algorithm for calculating the next transaction specific code. In these applications, the pointer refers to the number of steps into the algorithm or the value input into the algorithm and the transaction specific code is the calculated output of the algorithm. The host device is provided with the same algorithm and compares the transaction specific code received from the communicating device with the next expected transaction specific code. The concept of tolerance described earlier may be incorporated either by setting an acceptable range of values for the transaction specific code (output of the algorithm) or the pointer itself (input to the algorithm), the later being the equivalent of back calculating the pointer and verifying that it is within the range of tolerance.

ENCRYPTION KEY MANAGEMENT

Each aspect of the invention described above may be applied in a manner that secures the content of the communication. The communication is secured in the sense that the invention makes it extremely difficult for any unauthorized device receiving the communication to convert the communication into an understandable or meaningful form. This is accomplished utilizing any conventional encryption/decryption algorithm or method in combination with a sequence of encryption keys that are known by both the transmitting and receiving communicating devices and incremented periodically in a manner similar to the transaction specific codes described above. The methods and systems of the present invention provide the basis for establishing virtual private networks and virtual private domains.

It should be noted that the invention lends itself to use in securely communicating data, authenticating communication devices, or both in combination. For example, first and second communicating devices may be equipped with identical sequences of both transaction specific codes and encryption keys. The sequence of transaction specific codes is useful for authenticating the communicating device for a particular transaction or data transmission and preventing successful use of cloned devices. The sequence of encryption keys is useful for limiting access to the data being communicated. These two aspects of the present invention may used in combination to secure a communication against different types of security breaches.

It is anticipated that the present invention may be applied to various industries or markets which carry out transactions on the Internet, such as information publishing, hard good purchasing, electronic goods, micro transactions, business-to-business communications, business-to-consumer communications, and disparate security components. The present invention is also believed to be suitable for use in digital voice or multi-media, secure personal communications, financial control systems, government spending control systems, and corporate information systems. Specifically, the present invention may be used for identifying, encrypting and decrypting identifications, data, digital signatures, coupons, offers, certificates, session identification codes, VPN encryption pipe, secure transaction messages, data handling, verification, audit trails, authentication and the like.

Any available encryption/decryption technique or algorithm may be suitable for use in accordance with the present invention. However, it is preferred to use an encryption/ decryption process that is compatible with high speed processing of data. Furthermore, it is not particularly necessary, although it is certainly possible, for the encryption/ decryption technique or algorithm to be highly sophisticated. Rather, the greatly increased security provided by the present invention is due to a key management system and method that changes the key sufficiently often that breaking the code to determine a single key is practically worthless. Furthermore, even if a party intercepting the communication knows the entire sequence of keys (perhaps provided to the intercepting party by an insider having access to one of the communicating devices), it would be an exceedingly difficult task to determine how to match the sequence of keys with the relevant portion of the communication.

Figure 8:
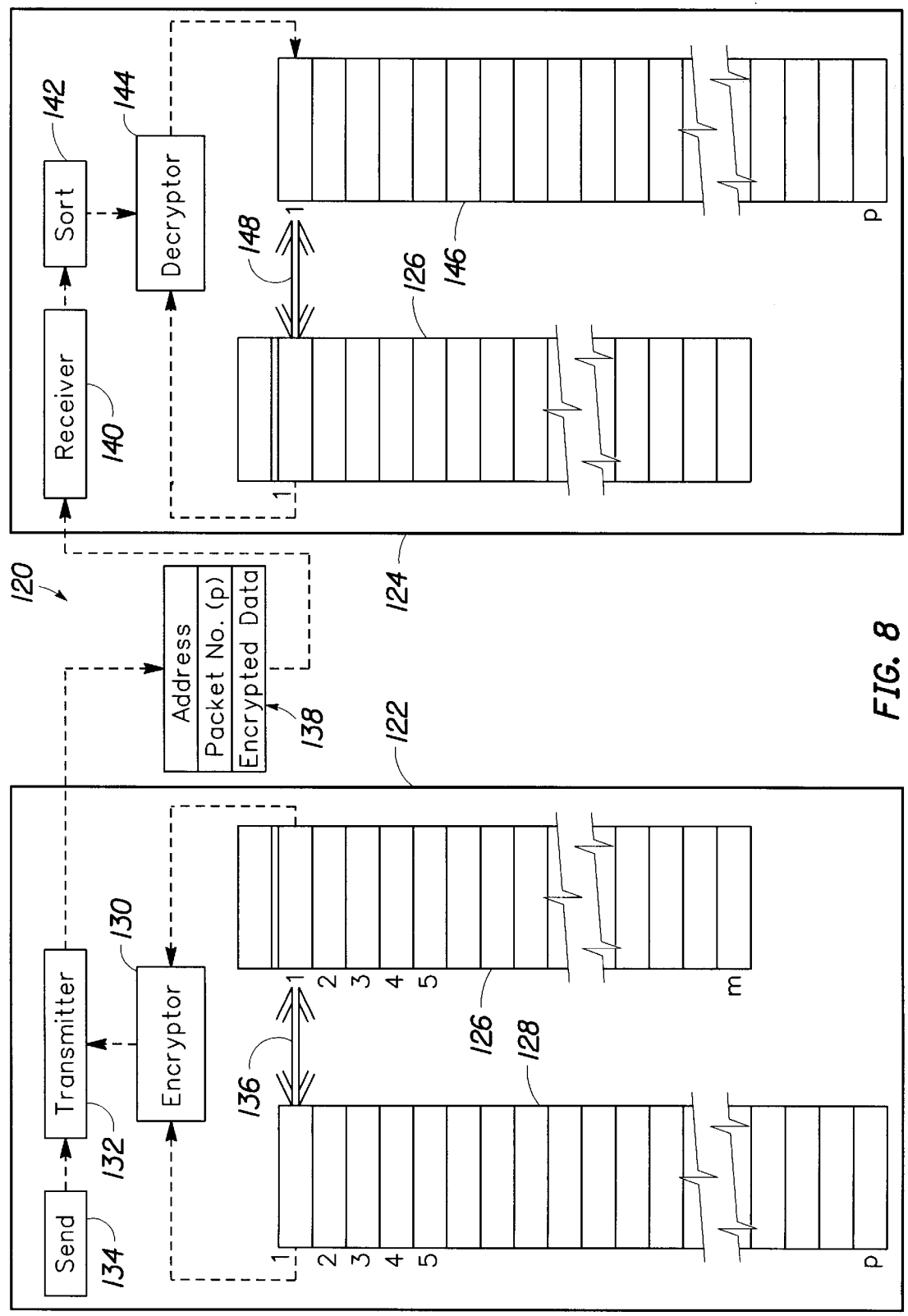
FIG. 8 is a schematic diagram of a system for securing data communications between first and second communicating devices.

FIG. 8 is a schematic diagram of a system 120 for securing data communications between a first communicating device 122 and second communicating device 124. The communicating devices 122, 124 may be any device or collection of devices capable of storing data, storing or calculating keys, encrypting or decrypting, and transmitting or receiving. The communicating devices preferably comprise a microprocessor and may take the form of a personal or mainframe computer equipped with a modem and software for communicating with other computers, encrypting or decrypting data and managing a database of data. It should be recognized that both the hardware and software components of the system may be provided by multiple interconnected units or as a single integrated unit. Specifically, the present invention may be implemented using various commercially available or otherwise publicly known data encryption software or devices, wherein the synchronous key management is handled by a customized subroutine or stand alone software that passes the keys to the encryption software as needed.

The first communicating device 122 includes a first sequence, list or database for storing encryption keys 126, a source of data 128 (shown here schematically as a series of packetized data segments), an encrypter 130, a transmitter 132 and means 134 for initiating the communication. The encrypter 130 uses a key from the database 126 adjacent the pointer 136 to encrypt the data segment adjacent the pointer 136. The encrypted data is provided to the transmitter 132 for sending to the second communicating device 124. The communication 138 will typically comprise the address of the destination (i.e., the communicating device 124), a packet number facilitating verification that the entire communication was received, and the encrypted data itself.

The second communicating device 124 includes a receiver 140, a sorting device or software 142 for reorganizing the communication packets 138, a decrypter 144 in communication with a sequence, list or database of encryption keys 126 for decrypting the data, and a storage device 146 for maintaining the decrypted data. It should be recognized that the devices 122, 124 may include various other capabilities known in the art, such as error checking or processing of the decrypted data.

The identical sequences of encryption keys 126 in both the first and second communicating devices 122, 124 are synchronized by incrementing the pointers 136, 148 in a consistent manner. For example, the pointer 136 may be incremented to the next encryption key in the sequence 126 after encrypting each data segment or a certain number of data segments. Similarly, the pointer 148 may be incremented to the next encryption key after decrypting the each encrypted data segment or a certain number of encrypted data segments. While many other protocols for movement of the pointers through the sequence of keys, it is primarily important that both pointers 136, 148 be synchronized, not in time, but with respect to the packets of data transmitted and received so that the key used for decrypting a given packet is the same as the key that was used to encrypt the packet. The encryption keys may be managed in accordance with any of the methods described above with respect to transaction specific codes. Specifically, the sequence of encryption keys may be provided with tolerance and include the capability of being resynchronized.

The databases 126 may comprise any number (m) of keys which are preferably reused in a cyclical pattern, i.e., upon using key (m) returning to use key (1). The databases 128, 146 may be of any length or size, specifically the number of encrypted packets may be either shorter (<m) or longer (>m) than the database 126.

The present methods of securely communicating may be initiated in various ways known to those in the art, but the communications are preferably initiated by using public/ private keys. For example, a first communicating device may transmit a message to a second communicating device utilizing the second communicating device's public key, where the message includes a seed. Keys may be passed back and forth between the communicating devices any number of times, preferably three or more times depending on the level of security desired. This "handshake" or initiation process provides both communicating devices with the same starting point (or pointer) in an already mutually known sequence of keys or perhaps even provides both communicating devices with the same sequence of keys.

While the foregoing is directed to the preferred embodiment of the present invention, other and further embodiments of the invention may be devised without departing from the basic scope thereof, and the scope thereof is determined by the claims which follow.

What is claimed is:

1. A method of securely communicating a sequence of data segments, comprising:

(a) providing a first communicating device with a first sequence of encryption keys;

(b) providing a second communicating device with a second sequence of encryption keys, wherein the first and second sequences are identical;

(c) setting pointers in the first and second sequences at the same encryption key;

(d) encrypting each of the data segments in the sequence of data segments from the first communicating device using a different encryption key beginning with the encryption key adjacent the pointer in the first sequence of encryption keys;

(e) incrementing the pointer in the first sequence of encryption keys after encrypting each of the data segments;

(f) transmitting the encrypted data segments from the first communicating device;

(g) receiving the encrypted data segments in the second communicating device;

(h) decrypting each of the data segments in the sequence of encrypted data received by the second communicating device using a different encryption key beginning with the encryption key adjacent the pointer in the second sequence of encryption keys; and (i) incrementing the pointer in the second sequence of encryption keys after decrypting each of the data segments.

2. The method of claim 1, wherein the first and second sequences of encryption keys are stored in a database.

3. The method of claim 1, wherein the first and second sequences of encryption keys are calculated.

4. The method of claim 1, wherein the first communicating device is a computer and the second communicating device is a computer.

5. The method of claim 1, wherein the first communicating device is a direct broadcast television system and the second communicating device is a television receiver.

6. The method of claim 1, wherein the communication is transmitted via electronic means, radio wave means or optical wave means.

7. The method of claim 4, wherein the first and second communicating devices are part of a virtual private network.

8. The method of claim 1, further comprising the step of:

(j) reusing the sequences of encryption keys.

9. The method of claim 8, wherein the sequence of data segments has a greater number of data segments than the number of encryption keys in the sequence of encryption keys.

10. The method of claim 1, wherein the first and second communicating devices are provided with a identical sequences of encryption keys by a different means than is used in the step of transmitting.

11. The method of claim 1, wherein the step of incrementing the pointer in the first sequence of encryption keys occurs without acknowledgment that the second communicating device received the data segment encrypted with the encryption key at the pointer.

* * * * *